(12) United States Patent
Wang

(10) Patent No.: US 12,015,318 B1
(45) Date of Patent: Jun. 18, 2024

(54) VIBRATION MOTOR WITH HOUSING WITH MOUNTING HOLES AND COLUMNS

(71) Applicant: HUBEI ZUANMA INTELLIGENT CONTROL TECHNOLOGY CO., LTD, E'Zhou (CN)

(72) Inventor: Sen Wang, Dongguan (CN)

(73) Assignee: HUBEI ZUANMA INTELLIGENT CONTROL TECHNOLOGY CO., LTD, E'zhou (CN)

( * ) Notice: Subject to any disclaimer, the term of this patent is extended or adjusted under 35 U.S.C. 154(b) by 0 days.

(21) Appl. No.: 18/528,929

(22) Filed: Dec. 5, 2023

(30) Foreign Application Priority Data

Nov. 3, 2023 (CN) .......................... 202322995871.9

(51) Int. Cl.
*H02K 33/02* (2006.01)
*H02K 11/00* (2016.01)

(52) U.S. Cl.
CPC ......... *H02K 33/02* (2013.01); *H02K 11/0094* (2013.01); *H02K 2203/03* (2013.01); *H02K 2211/03* (2013.01)

(58) Field of Classification Search
CPC ........ H02K 35/00; H02K 35/02; H02K 35/04; H02K 35/06; H02K 7/1869; H02K 7/1876; H02K 7/1892; H02K 33/00; H02K 33/02; H02K 33/16
USPC ........ 310/25, 15, 12.01, 81, 80, 321, 20, 21, 310/28–30, 36–37, 40 MM
See application file for complete search history.

(56) References Cited

U.S. PATENT DOCUMENTS

| 4,346,318 | A  | * | 8/1982  | Shtrikman | ............. | H02K 33/06 |
| | | | | | | 310/12.24 |
| 4,831,292 | A  | * | 5/1989  | Berry | ..................... | H02K 33/06 |
| | | | | | | 310/23 |
| 5,587,615 | A  | * | 12/1996 | Murray | .................. | H02K 33/16 |
| | | | | | | 310/15 |
| 6,914,351 | B2 | * | 7/2005  | Chertok | ................. | H02K 35/02 |
| | | | | | | 310/12.26 |
| 7,633,189 | B2 | * | 12/2009 | Iwasa | ..................... | H02K 41/03 |
| | | | | | | 310/15 |
| 7,687,943 | B2 | * | 3/2010  | Lunde | .................. | H02K 7/1846 |
| | | | | | | 310/58 |

(Continued)

FOREIGN PATENT DOCUMENTS

WO    WO-2019003874 A1 * 1/2019

OTHER PUBLICATIONS

WO-2019003874-A1 English Translation.*

*Primary Examiner* — Maged M Almawri
(74) *Attorney, Agent, or Firm* — Daniel M. Cohn; Howard M. Cohn

(57) ABSTRACT

A vibration motor, related to a technical field of motor disassembly and assembly, including a vibration motor, including a motor bottom housing, a motor surface housing, and a vibration assembly. The motor bottom housing includes mounting holes, the motor surface housing includes mounting columns, the mounting columns are respectively inserted into the mounting holes and are fixed to the motor bottom housing through hot melting, the motor surface housing is configured to seal an opening of the motor bottom housing, the vibration assembly is configured to provide vibration for the vibration motor in a single-axis direction, and the motor bottom housing and the motor surface housing are formed through injection molding.

8 Claims, 5 Drawing Sheets

(56) References Cited

U.S. PATENT DOCUMENTS

| | | | | |
|---|---|---|---|---|
| 8,456,032 B2* | 6/2013 | Hochberg | H02K 21/12 | 290/43 |
| 8,704,387 B2* | 4/2014 | Lemieux | F03G 7/08 | 290/1 R |
| 8,941,251 B2* | 1/2015 | Zuo | H02K 35/02 | 290/1 R |
| 9,240,267 B2* | 1/2016 | Nagahara | H02K 35/02 | |
| 10,103,614 B2* | 10/2018 | Guo | H02K 33/18 | |
| 10,404,150 B2* | 9/2019 | Swanson | H02K 35/06 | |
| 10,581,309 B2* | 3/2020 | Da Conceição Rosa | | F16F 15/03 |
| 10,581,355 B1* | 3/2020 | Dyson | H02P 6/005 | |
| 10,930,838 B1* | 2/2021 | Miesner | H02N 2/043 | |
| 10,931,188 B2* | 2/2021 | Garcia-Herreros | H02K 15/03 | |
| 10,998,487 B1* | 5/2021 | Miesner | H10N 35/80 | |
| 11,522,429 B2* | 12/2022 | Takahashi | H02K 33/16 | |
| 11,569,723 B2* | 1/2023 | Ma | H02K 33/18 | |
| 11,831,215 B2* | 11/2023 | Li | H02K 33/10 | |
| 11,863,039 B2* | 1/2024 | Takahashi | H02K 33/16 | |
| 2003/0127916 A1* | 7/2003 | Godkin | H02K 41/0356 | 310/12.16 |
| 2006/0044093 A1* | 3/2006 | Ohta | H02K 99/20 | 335/220 |
| 2006/0219496 A1* | 10/2006 | Dimig | H01F 7/08 | 188/161 |
| 2008/0174187 A1* | 7/2008 | Erixon | H02K 33/16 | 310/15 |
| 2010/0176664 A1* | 7/2010 | Roberts | H02K 35/02 | 310/25 |
| 2012/0013202 A1* | 1/2012 | Lee | H02K 33/04 | 310/12.16 |
| 2012/0242086 A1* | 9/2012 | Yang | H02K 35/02 | 290/50 |
| 2012/0242175 A1* | 9/2012 | Yang | H02K 35/02 | 310/30 |
| 2012/0313459 A1* | 12/2012 | Zhang | H02K 33/18 | 310/25 |
| 2013/0093266 A1* | 4/2013 | Hong | H02K 33/18 | 29/446 |
| 2013/0193779 A1* | 8/2013 | Kuroda | H02K 33/12 | 310/15 |
| 2014/0054983 A1* | 2/2014 | Moon | H02K 33/16 | 310/28 |
| 2014/0062224 A1* | 3/2014 | Kim | H02K 33/16 | 310/15 |
| 2014/0202252 A1* | 7/2014 | Umehara | H02K 33/16 | 73/664 |
| 2015/0108854 A1* | 4/2015 | Akasaka | H02K 33/18 | 310/25 |
| 2015/0137627 A1* | 5/2015 | Katada | H02K 33/16 | 310/25 |
| 2017/0117788 A1* | 4/2017 | Hou | H02K 1/34 | |
| 2017/0214306 A1* | 7/2017 | Katada | H02K 33/16 | |
| 2017/0310203 A1* | 10/2017 | Takeda | H02K 33/16 | |
| 2018/0124296 A1* | 5/2018 | Mak | H04N 23/685 | |
| 2018/0216504 A1* | 8/2018 | De Mar | H02K 41/031 | |
| 2018/0335601 A1* | 11/2018 | Hu | G03B 5/00 | |
| 2019/0070635 A1* | 3/2019 | Takeda | H02K 33/18 | |
| 2019/0115817 A1* | 4/2019 | Monaghan | H02K 41/033 | |
| 2019/0238039 A1* | 8/2019 | Tsuchihashi | B06B 1/04 | |
| 2019/0348897 A1* | 11/2019 | Garcia-Herreros | F16B 37/122 | |
| 2020/0099284 A1* | 3/2020 | Bischoff | H02K 11/014 | |
| 2020/0195106 A1* | 6/2020 | Szczukiewicz | H02K 15/061 | |
| 2020/0412221 A1* | 12/2020 | Yan | H02K 33/16 | |
| 2020/0412226 A1* | 12/2020 | Ma | H02K 33/16 | |
| 2021/0149491 A1* | 5/2021 | Takahashi | G06F 3/016 | |
| 2022/0247293 A1* | 8/2022 | Kuroda | H02K 5/24 | |
| 2022/0255412 A1* | 8/2022 | Wang | H02K 33/16 | |
| 2022/0360156 A1* | 11/2022 | Li | H02K 33/10 | |
| 2023/0101894 A1* | 3/2023 | Takahashi | B06B 1/14 | 310/81 |

* cited by examiner

VIBRATION MOTOR WITH HOUSING WITH MOUNTING HOLES AND COLUMNS

TECHNICAL FIELD

The present disclosure relates to a technical field of motor disassembly and assembly, and in particular to a vibration motor.

BACKGROUND

Linear motors are mainly applied to communication terminals, such as mobile phones, tablet computers, wearable devices, etc. and devices, such as video game controllers, toys, etc., which have advantages of being fast in response speed, high in vibration sensation, small sizes, and are widely popular. However, a conventional motor structure generally has a housing made of a metal material, resulting in a higher manufacturing cost; in addition, an assembly method of the housing made of the metal material is relatively complex, which is inconvenient to disassemble and assemble.

Therefore, how to provide a vibration motor to reduce a lower manufacturing cost and disassembly difficulty thereof is an urgent technical problem to be solved.

SUMMARY

Technical problems to be solved by the present disclosure is how to provide a vibration motor to reduce a lower manufacturing cost and disassembly difficulty thereof.

Therefore, the present disclosure provides a vibration motor, including a motor bottom housing, a motor surface housing, and a vibration assembly. The motor bottom housing includes mounting holes, the motor surface housing includes mounting columns, the mounting columns are respectively inserted into the mounting holes and are fixed to the motor bottom housing through hot melting, the motor surface housing is configured to seal an opening of the motor bottom housing, the vibration assembly is configured to provide vibration for the vibration motor in a single-axis direction, and the motor bottom housing and the motor surface housing are formed through injection molding.

Furthermore, the motor surface housing and the mounting columns are integrally formed.

Furthermore, the vibration assembly includes a vibration block and an elastic component, the elastic component abuts against an inner wall of the motor bottom housing, the vibration block is disposed in the elastic component, and the vibration block is configured to drive the elastic component to deform and reciprocate in an axial direction thereof.

Furthermore, the vibration assembly includes a vibration block and an elastic component, the elastic component abuts against an inner wall of the motor bottom housing, the vibration block is disposed in the elastic component, and the vibration block is configured to drive the elastic component to deform and reciprocate in an axial direction thereof.

Furthermore, the vibration assembly further includes a coil, wiring terminals, and a flexible printed circuit (FPC) board. The vibration block passes through the coil and the wiring terminals. The coil, the wiring terminals, and the FPC boards are electrically connected. Two magnetic blocks are disposed in the motor bottom housing, and the two magnetic blocks are respectively located at two opposite ends of the vibration block.

Furthermore, the elastic component includes first bending portions at two ends, and the first bending portions are clamped in the motor bottom housing.

Furthermore, second bending portions are respectively disposed on the first bending portions, the second bending portions abut against the mounting columns.

Furthermore, the motor bottom housing further includes first mounting grooves and reinforcement bars, the two magnetic blocks are respectively embedded and disposed in the first mounting grooves, the reinforcement bars are respectively disposed in the first mounting grooves, and the reinforcement bars respectively abut against the two magnetic blocks.

Furthermore, the elastic component includes first mounting portions, the vibration block passes through the first mounting portions, and the wiring terminals respectively abut against the first mounting portions.

Furthermore, each of the wiring terminals includes a second mounting groove at one side, a corresponding one of the first mounting portions abuts against each the second mounting groove.

Furthermore, a first end of the FPC board is electrically connected to one of the wiring terminals, and a second end of the FPC board is embedded in an end surface of the motor surface housing.

The present disclosure has following beneficial effects.

Through inserting the mounting columns in the mounting holes, fixing the mounting columns with the motor bottom housing through hot melting, and sealing the opening of the motor bottom housing through the motor surface housing, the vibration motor of the present disclosure convenient for disassembly and assembly is provided. Moreover, since the motor bottom housing and the motor surface housing are formed through injection molding, a metal outer housing is not needed, thereby reducing a manufacturing cost of the vibration motor.

BRIEF DESCRIPTION OF DRAWINGS

In order to more clearly illustrate embodiments of the present disclosure or technical solutions in the prior art, drawings that need to be used in the embodiments or the prior art are briefly described below, and it is obvious that the drawings in following description are merely some embodiments of the present disclosure, and for those who skilled in the art, other drawings may be obtained according to structures shown in the accompanying drawings.

Figure 1:
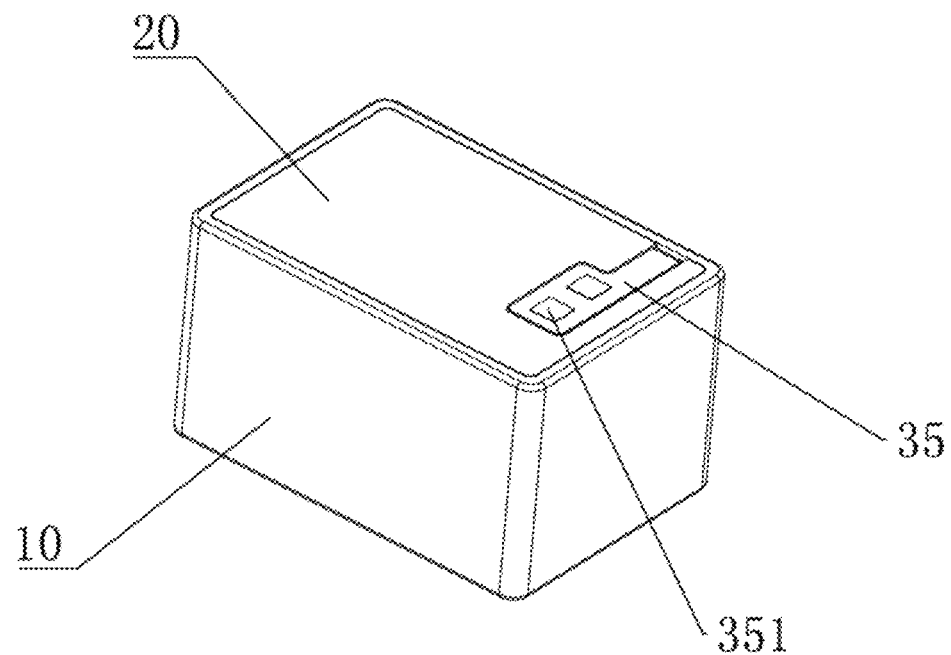
FIG. 1 is a three-dimensional structural schematic diagram of a vibration motor according to one embodiment of the present disclosure.

Reference numerals in the drawings: 10. motor bottom housing; 11. mounting hole; 12. first mounting groove; 13. reinforcement bar; 20. motor surface housing; 21. mounting column; 22. third mounting groove; 30. vibration assembly; 31. vibration block; 32. elastic component; 321. first bending portion; 322. second bending portion; 323. first mounting portion; 33. coil; 34. wiring terminal; 341. second mounting groove; 35. flexible printed circuit (FPC) board; 351. welding pint; 36. magnetic block.

DETAILED DESCRIPTION OF EMBODIMENTS

In order to make purposes, technical solutions, and advantages of the present disclosure clearer, the present disclosure is further described in detail below with reference to accompanying drawings and embodiments. It should be understood that the specific embodiments described herein are merely used to explain the present disclosure, and are not intended to limit the present disclosure.

In description of the present disclosure, it should be noted that unless expressly specified and defined otherwise, the terms "mount", "connect with" and "connect to" shall be broadly construed, for example, the term "connect" may be fixed connection or detachable connection, or integrally connection; may be mechanical connection or electrical connection; may be direct connection or indirect connection through an intermediate medium, or may be a communication between two elements, and may be a wireless connection or a wired connection. For those who skilled in the art, a specific meaning of the above terms in the present disclosure may be specifically understood.

Moreover, in the description of the present disclosure, it should be noted that orientation or positional relationships indicated by terms "central", "upper", "lower", "left", "right", "vertical", "horizontal", "inner", "outer", etc. are based on the orientation or positional relationships shown in the drawings, rather than indicating or implying that a referred device or element must have a specific orientation and must construct and operate in a specific orientation, and therefore cannot be understood as a limitation to the present disclosure. In addition, terms "first", "second", and "third" are used for descriptive purposes only and cannot be understood as indicating or implying relative importance.

In addition, technical features involved in different embodiments of the present disclosure described below may be combined with each other as long as there is no conflict between each other.

The present disclosure provides a vibration motor, as shown in FIGS. 1-7, including a motor bottom housing 10, a motor surface housing 20, and a vibration assembly 30. The motor bottom housing 10 includes mounting holes 11, the motor surface housing 20 includes mounting columns 21, the mounting columns 21 are respectively inserted into the mounting holes 11 and are fixed to the motor bottom housing 10 through hot melting, the motor surface housing 20 is configured to seal an opening of the motor bottom housing 10, the vibration assembly 30 is configured to provide vibration for the vibration motor in a single-axis direction, and the motor bottom housing 10 and the motor surface housing 20 are formed through injection molding.

It should be noted that, through inserting the mounting columns 21 in the mounting holes 11, fixing the mounting columns 21 with the motor bottom housing 10 through hot melting, and sealing the opening of the motor bottom housing 10 through the motor surface housing 20, the vibration motor of the present disclosure convenient for disassembly and assembly is provided. Moreover, since the motor bottom housing 10 and the motor surface housing 20 are formed through injection molding, a metal outer housing is not needed, thereby reducing a manufacturing cost of the vibration motor.

As shown in drawings, the motor surface housing 20 and the mounting columns 21 are integrally formed. In a specific implementation process, four mounting columns 21 and four mounting holes 11 are provided, the four mounting columns 21 are correspondingly distributed at four corners of the motor surface housing 20, the four mounting holes 11 are correspondingly distributed at four corners of the motor bottom housing 10. The motor surface housing 20 is fastened and mounted on the motor bottom housing 10 through the four mounting columns 21 and the four mounting holes 11.

As shown in FIGS. 2-7, the vibration assembly 30 includes a vibration block 31 and an elastic component 32, the elastic component 32 abuts against an inner wall of the motor bottom housing 10, the vibration block 31 is disposed in the elastic component 32, and the vibration block 31 is configured to drive the elastic component 32 to deform and reciprocate in an axial direction thereof. It should be noted that, when the vibration block 31 drives the elastic component 32 to deform and reciprocate in the axial direction thereof, the vibration motor is driven to vibrate in the single-axis direction, and when the vibration motor is applied to a video game controller, vibration sense is provided to users, thereby improving use experience of the users.

Figure 2:
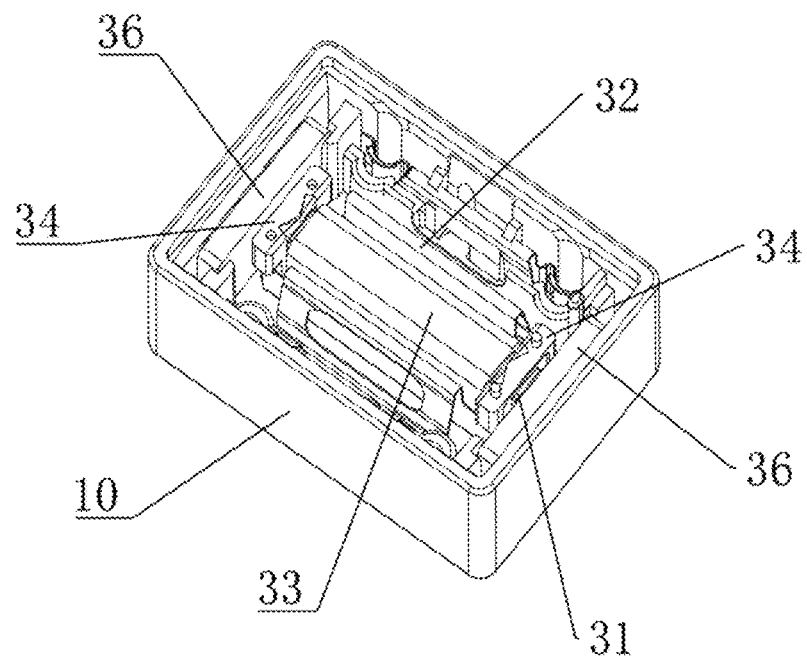
FIG. 2 is a partial structural schematic diagram of the vibration motor according to one embodiment of the present disclosure.
Figure 3:
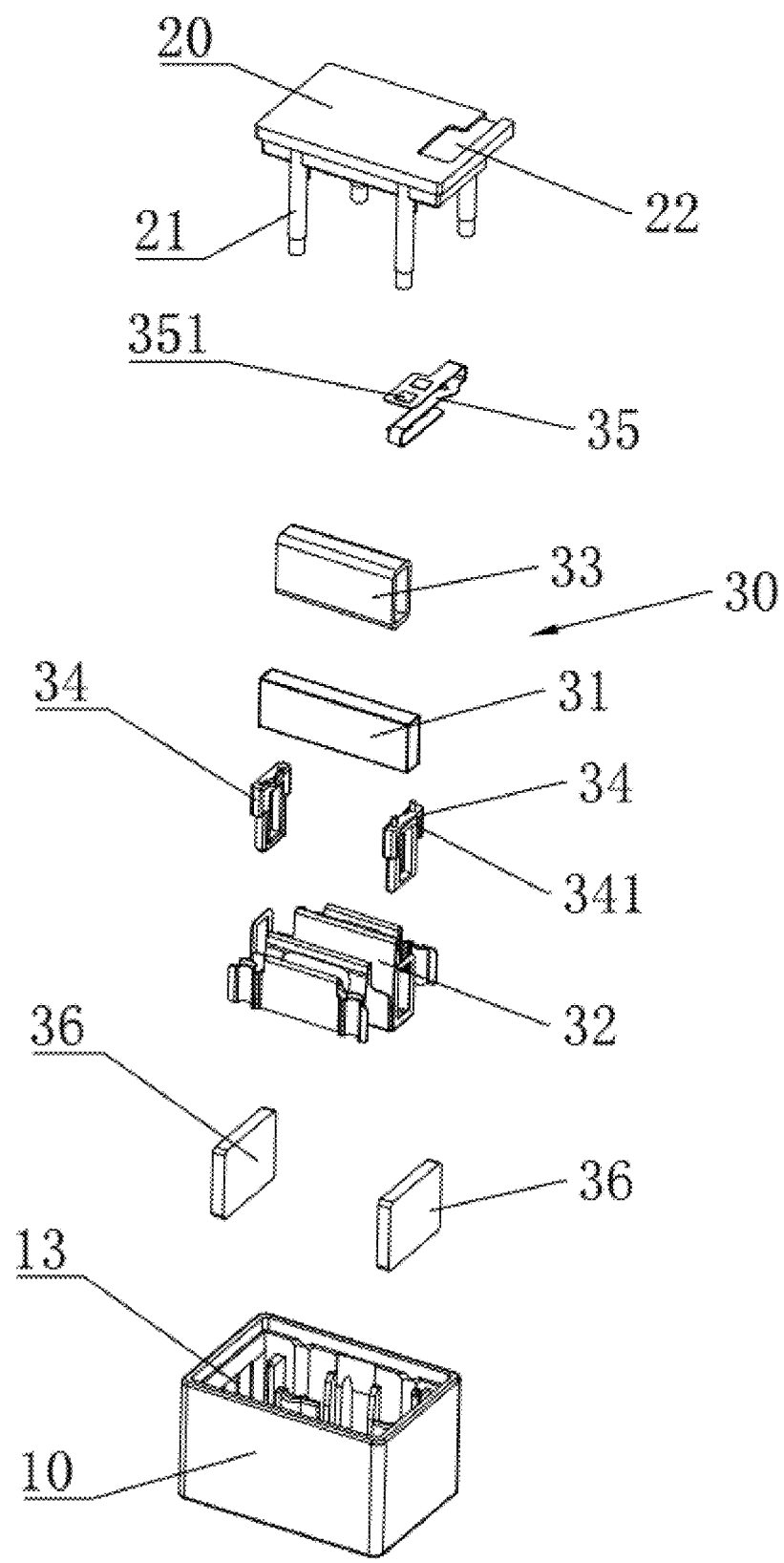
FIG. 3 is an exploded structural schematic diagram of the vibration motor according to one embodiment of the present disclosure.
Figure 4:
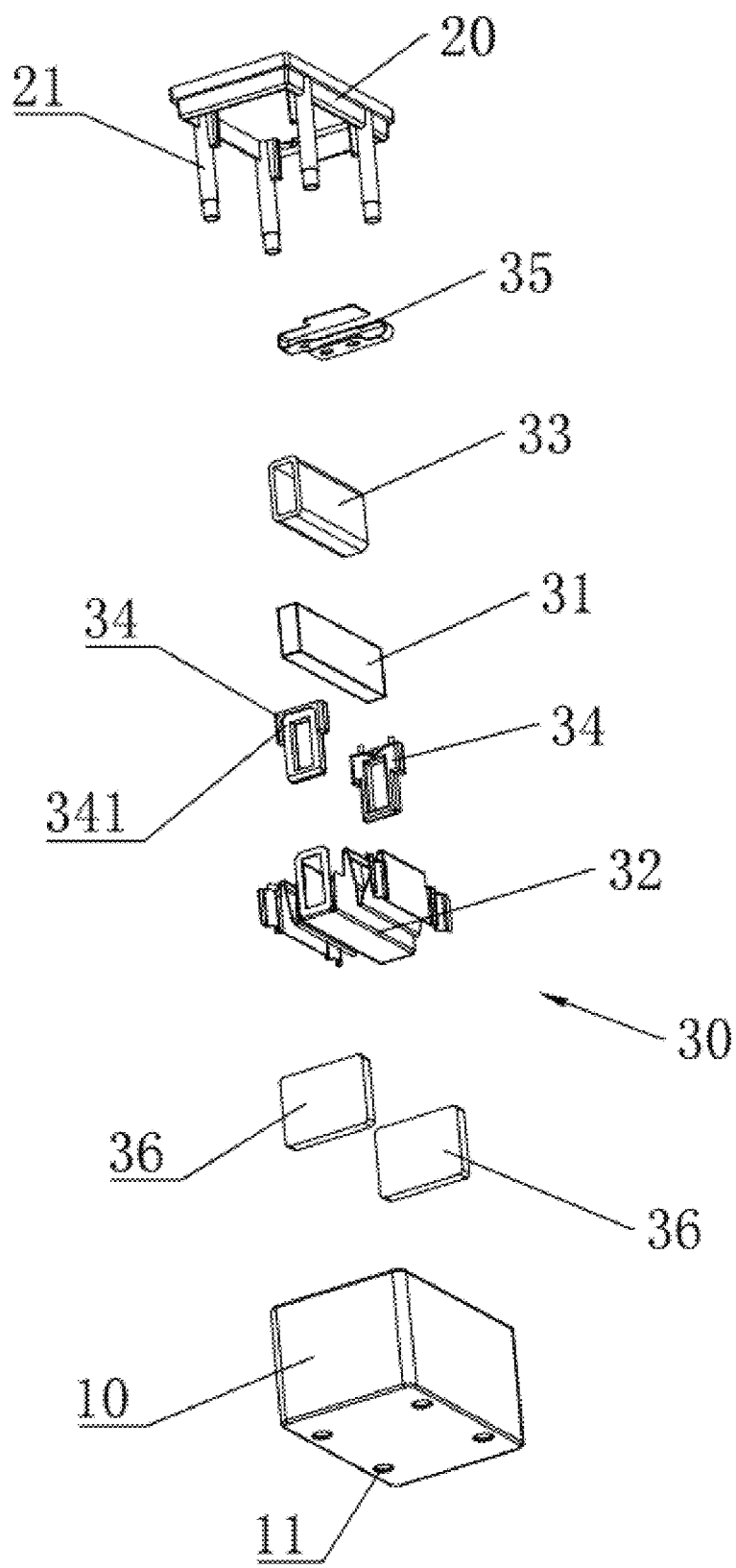
FIG. 4 is another exploded structural schematic diagram of the vibration motor according to one embodiment of the present disclosure.
Figure 5:
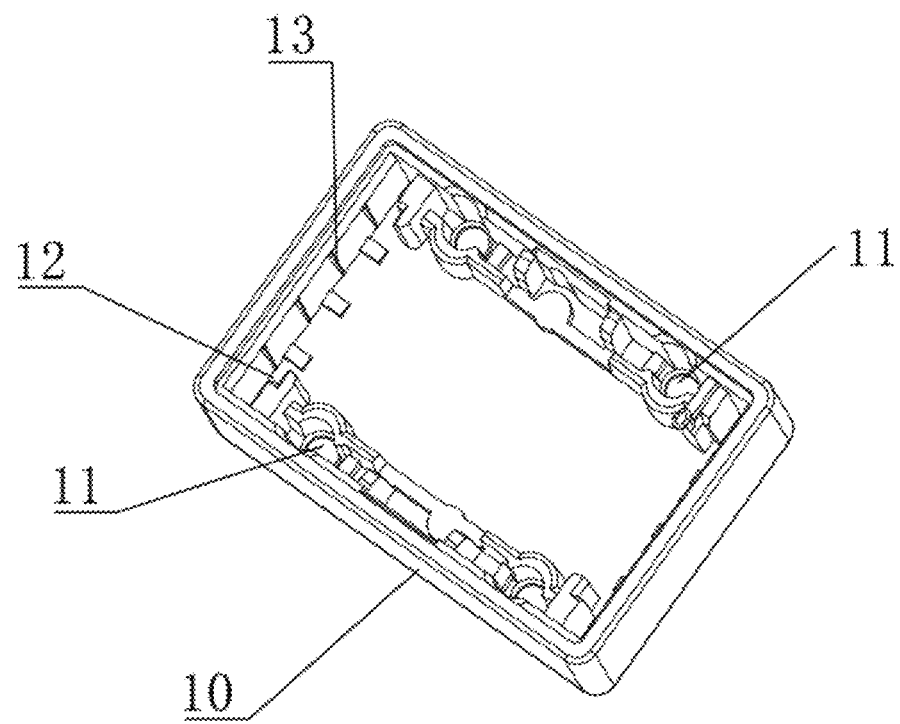
FIG. 5 is a structural schematic diagram of a motor bottom housing of the vibration motor according to one embodiment of the present disclosure.
Figure 6:
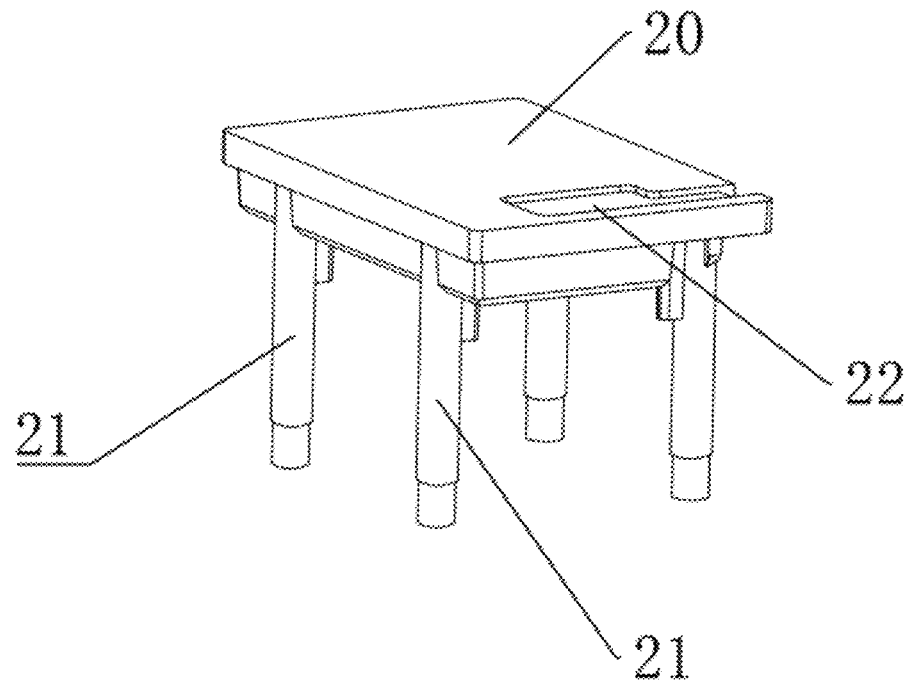
FIG. 6 is a structural schematic diagram of a motor surface housing of the vibration motor according to one embodiment of the present disclosure.
Figure 7:
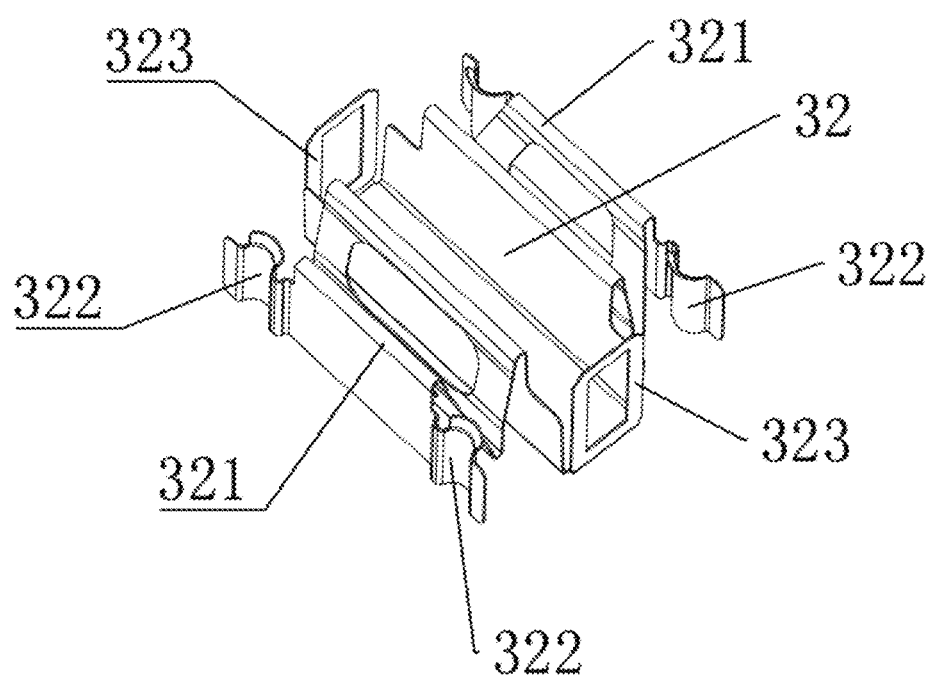
FIG. 7 is a structural schematic diagram of an elastic component of the vibration motor according to one embodiment of the present disclosure.

As shown in FIGS. 2-4, the vibration assembly 30 further includes a coil 33, wiring terminals 34, and a flexible printed circuit (FPC) board 35. The vibration block 31 passes through the coil 33 and the wiring terminals 34. The coil 33, the wiring terminals 34, and the FPC boards 35 are electrically connected. Two magnetic blocks 36 are disposed in the motor bottom housing 10, and the two magnetic blocks 36 are respectively located at two opposite ends of the vibration block 31. In a specific implementation process, the coil 33 is a copper wire, and the wiring terminals are sleeved on end portions of the vibration block 31.

It should be noted that, magnitude of current passing through the coil 33 is controlled through the FPC board 35, the vibration block 31 vibrates to drive the elastic component 32 to deform and reciprocate in the axial direction thereof, so that the vibration motor vibration motor is driven to vibrate in the single-axis direction.

As shown in FIGS. 2-7, the elastic component 32 includes first bending portions 321 at two ends, and the first bending portions 321 are clamped in the motor bottom housing 10. It should be noted that, the vibration block 31 is vibrated through the first bending portions 321, so that the vibration block 31 extrudes the elastic component 32 to deform, and vibration transmission is achieved.

As shown in FIGS. 2-7, second bending portions 322 are respectively disposed on the first bending portions 321, the second bending portions 322 abut against the mounting columns 21. It should be noted that the second bending portions 322 abut between the mounting columns 21 and the motor bottom housing 10, so that the elastic component 32 is more stably mounted in the motor bottom housing 10 through the elastic component 32.

As shown in FIGS. 2-5, the motor bottom housing 10 further includes first mounting grooves 12 and reinforcement bars 13, the two magnetic blocks 36 are respectively embedded and disposed in the first mounting grooves 12, the reinforcement bars 13 are respectively disposed in the first mounting grooves 12, and the reinforcement bars 13 respectively abut against the two magnetic blocks 36. It should be noted that, since the reinforcement bars 13 respectively abut against the two magnetic blocks 36, the two magnetic blocks are prevented from generating resonance.

As shown in FIGS. 2-7, the elastic component 32 includes first mounting portions 323, the vibration block 31 passes through the first mounting portions 323, and the wiring terminals 34 respectively abut against the first mounting portions 232. In a specific implementation process, two first mounting portions 323 are provided, the two first mounting portions 323 are distributed at two opposite sides of the elastic component 32, and the two first mounting portions 323 are respectively disposed adjacent to the first bending portions 321 and the second bending portions 322, and the vibration block 31 passes through the two first mounting portions. The first mounting portions 323 are configured to facilitate the vibration block 31 to drive the elastic component 32 to deform when vibrating.

As shown in FIGS. 2-4, each of the wiring terminals 34 includes a second mounting groove 341 at one side, a corresponding one of the first mounting portions 323 abuts against each the second mounting groove 341. It should be noted that, the wiring terminals 34 are limited and mounted through abutting the corresponding one of the first mounting against each the second mounting groove 341, when the vibration block 31 vibrates, the vibration block 31 further drives the elastic component 32 to deform and also drives the wiring terminals 34 to vibrate at the same time.

As shown in FIGS. 2-7, a first end of the FPC board 35 is electrically connected to one of the wiring terminals 34, and a second end of the FPC board 35 is embedded in an end surface of the motor surface housing 20. In a specific implementation process, a third mounting groove 22 is defined on the motor surface housing 20, the second end of the FPC board 35 is embedded in the third mounting groove 22, and two welding points 351 for connecting external circuits are disposed on the FPC board 35.

In a specific implementation process, through controlling by the FPC board 35, the coil 33 is energized, and due to a magnetic field effect and magnitude changing of the current, the vibration block 31 is driven to move to drive the wiring terminals 34, the first mounting portions 323, and the coil 33 to move at the same time, the vibration block 31 vibrates to drive the elastic component 32 to deform and reciprocate in the axial direction thereof, so that the vibration motor vibration motor is driven to vibrate in the single-axis direction.

A working principle of the vibration motor is that through inserting the mounting columns 21 in the mounting holes 11, fixing the mounting columns 21 with the motor bottom housing 10 through hot melting, and sealing the opening of the motor bottom housing 10 through the motor surface housing 20, the vibration motor of the present disclosure convenient for disassembly and assembly is provided. Moreover, since the motor bottom housing 10 and the motor surface housing 20 are formed through injection molding, the metal outer housing is not needed, thereby reducing the manufacturing cost of the vibration motor.

Obviously, above-mentioned embodiments are merely examples which are clearly illustrated, and are not limited to the embodiments. For those who skilled in the art, other different forms of changes or variations can be made on the basis of the above description. There is no need for all implementations to be exhaustive herein. It should be apparent from the present disclosure that variations or variations are still within a scope of protection created by the present disclosure.

What is claimed is:

1. A vibration motor, comprising:
   a motor bottom housing;
   a motor surface housing; and
   a vibration assembly;
   wherein the motor bottom housing comprises mounting holes, the motor surface housing comprises mounting columns, the mounting columns are respectively inserted into the mounting holes and are fixed to the motor bottom housing through hot melting, the motor surface housing is configured to seal an opening of the motor bottom housing, the vibration assembly is configured to provide vibration for the vibration motor in a single-axis direction, and the motor bottom housing and the motor surface housing are formed through injection molding;
   wherein the vibration assembly comprises a vibration block and an elastic component, the elastic component abuts against an inner wall of the motor bottom housing, the vibration block is disposed in the elastic component, and the vibration block is configured to drive the elastic component to deform and reciprocate in an axial direction thereof;
   wherein the vibration assembly further comprises a coil, wiring terminals, and a flexible printed circuit (FPC) board; the vibration block passes through the coil and the wiring terminals; the coil, the wiring terminals, and the FPC board are electrically connected; two magnetic blocks are disposed in the motor bottom housing, and the two magnetic blocks are respectively located at two opposite ends of the vibration block;
   wherein the motor bottom housing further comprises first mounting grooves and reinforcement bars, the two magnetic blocks are respectively embedded and disposed in the first mounting grooves, the reinforcement bars are respectively disposed in the first mounting grooves, and the reinforcement bars respectively abut against the two magnetic blocks.

2. The vibration motor according to claim 1, wherein the motor surface housing and the mounting columns are integrally formed.

3. The vibration motor according to claim 1, wherein a first end of the FPC board is electrically connected to one of the wiring terminals, and a second end of the FPC board is embedded in an end surface of the motor surface housing.

4. The vibration motor according to claim 1, wherein the elastic component comprises first bending portions at two ends, and the first bending portions are clamped in the motor bottom housing.

5. The vibration motor according to claim 4, wherein second bending portions are respectively disposed on the first bending portions, the second bending portions abut against the mounting columns.

6. The vibration motor according to claim 1, wherein the elastic component comprises first mounting portions, the vibration block passes through the first mounting portions, and the wiring terminals respectively abut against the first mounting portions.

7. The vibration motor according to claim 6, wherein each of the wiring terminals comprises a second mounting groove at one side, a corresponding one of the first mounting portions abuts against each the second mounting groove.

8. A vibration motor, comprising:
   a motor bottom housing;

a motor surface housing; and a vibration assembly;

wherein the motor bottom housing comprises mounting holes, the motor surface housing comprises mounting columns, the mounting columns are respectively inserted into the mounting holes and are fixed to the motor bottom housing through hot melting, the motor surface housing is configured to seal an opening of the motor bottom housing, the vibration assembly is configured to provide vibration for the vibration motor in a single-axis direction, and the motor bottom housing and the motor surface housing are formed through injection molding;

wherein the vibration assembly comprises a vibration block and an elastic component, the elastic component abuts against an inner wall of the motor bottom housing, the vibration block is disposed in the elastic component, and the vibration block is configured to drive the elastic component to deform and reciprocate in an axial direction thereof;

wherein the vibration assembly further comprises a coil, wiring terminals, and a flexible printed circuit (FPC) board; the vibration block passes through the coil and the wiring terminals; the coil, the wiring terminals, and the FPC board are electrically connected; two magnetic blocks are disposed in the motor bottom housing, and the two magnetic blocks are respectively located at two opposite ends of the vibration block;

wherein the elastic component comprises first mounting portions, the vibration block passes through the first mounting portions, and the wiring terminals respectively abut against the first mounting portions.

* * * * *